United States Patent
Kobilka et al.

(10) Patent No.: US 12,357,978 B2
(45) Date of Patent: Jul. 15, 2025

(54) LIGHT UPCONVERSION MICROCAPSULES

(71) Applicant: International Business Machines Corporation, Armonk, NY (US)

(72) Inventors: Brandon M. Kobilka, Fishkill, NY (US); Jason T. Wertz, Pleasant Valley, NY (US); Sarah K. Czaplewski-Campbell, Rochester, MN (US); Eric J. Campbell, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 995 days.

(21) Appl. No.: 16/987,943

(22) Filed: Aug. 7, 2020

(65) Prior Publication Data

US 2022/0040682 A1     Feb. 10, 2022

(51) Int. Cl.
*B65D 65/06*     (2006.01)
*B01J 31/02*     (2006.01)
(Continued)

(52) U.S. Cl.
CPC ......... *B01J 31/183* (2013.01); *B01J 31/0271* (2013.01); *B01J 31/06* (2013.01);
(Continued)

(58) Field of Classification Search
CPC ...... B01J 31/183; B01J 31/0271; B01J 31/06; B01J 31/1815; B01J 35/19; B01J 35/39; B01J 37/0072; B01J 37/04; B01J 2231/005; B01J 2531/008; B01J 2531/824; B01J 2531/828; B01J 13/14; B01J 31/181; B01J 2531/821; B01J 2531/827; C09K 11/07
See application file for complete search history.

(56) References Cited

U.S. PATENT DOCUMENTS

| | | | | |
|---|---|---|---|---|
| 4,816,371 A | * | 3/1989 | Wright | G03F 7/002 430/394 |
| 5,030,540 A | * | 7/1991 | Sangyoji | G03F 7/002 156/DIG. 5 |

(Continued)

FOREIGN PATENT DOCUMENTS

| | | |
|---|---|---|
| CN | 105938875 B | 8/2018 |
| CN | 108534909 A | 9/2018 |

(Continued)

OTHER PUBLICATIONS

"Pd Porph-Basic Synthesis," SciFinder Results, Received: Aug. 29, 2019, 2 pages.

(Continued)

*Primary Examiner* — Kevin R Kruer
(74) *Attorney, Agent, or Firm* — Kelsey Skodje

(57) ABSTRACT

A composition, method, and article of manufacture are disclosed. The composition is a microcapsule that includes a transparent shell encapsulating a mixture comprising light upconversion molecules. The method is a method of forming a microcapsule, which includes obtaining light upconversion molecules, forming an emulsion of the light upconversion molecules and a shell formation solution, and encapsulating the light upconversion molecules in a transparent shell. The article of manufacture comprises the microcapsule.

20 Claims, 3 Drawing Sheets

(51) Int. Cl.
| | |
|---|---|
| *B01J 31/06* | (2006.01) |
| *B01J 31/18* | (2006.01) |
| *B01J 35/00* | (2006.01) |
| *B01J 35/39* | (2024.01) |
| *B01J 37/00* | (2006.01) |
| *B01J 37/04* | (2006.01) |
| *B25G 1/10* | (2006.01) |
| *C09K 11/07* | (2006.01) |
| *A63B 60/14* | (2015.01) |
| *B62K 21/26* | (2006.01) |

(52) U.S. Cl.
CPC .......... *B01J 31/1815* (2013.01); *B01J 35/19* (2024.01); *B01J 35/39* (2024.01); *B01J 37/0072* (2013.01); *B01J 37/04* (2013.01); *C09K 11/07* (2013.01); *B01J 2231/005* (2013.01); *B01J 2531/008* (2013.01); *B01J 2531/824* (2013.01); *B01J 2531/828* (2013.01)

(56) References Cited

U.S. PATENT DOCUMENTS

| | | | | |
|---|---|---|---|---|
| 5,053,309 | A * | 10/1991 | Sanders | G03C 7/46 430/365 |
| 5,064,736 | A * | 11/1991 | Grosso | G03G 9/093 430/107.1 |
| 5,153,634 | A * | 10/1992 | Sanders | G03F 7/002 355/400 |
| 5,185,226 | A * | 2/1993 | Grosso | G03G 9/08 430/110.2 |
| 5,955,237 | A * | 9/1999 | Hattori | G03F 7/002 430/281.1 |
| 8,129,908 | B2 | 3/2012 | Roebke et al. | |
| 8,198,912 | B1 | 6/2012 | Thinkakaran et al. | |
| 8,421,356 | B1 * | 4/2013 | Wedding | H01J 11/18 313/582 |
| 8,951,608 | B1 * | 2/2015 | Wedding | H01J 9/241 427/230 |
| 9,196,860 | B2 | 11/2015 | Xia | |
| 9,291,561 | B2 | 3/2016 | Hauser et al. | |
| 10,175,557 | B2 | 1/2019 | Murakami et al. | |
| 11,851,579 | B2 * | 12/2023 | Stevens | G01N 21/8422 |
| 2010/0261263 | A1 * | 10/2010 | Vo-Dinh | B82Y 20/00 977/773 |
| 2011/0117202 | A1 * | 5/2011 | Bourke, Jr. | A61N 1/44 977/773 |
| 2014/0271894 | A1 | 9/2014 | Boday et al. | |
| 2015/0238638 | A1 * | 8/2015 | Han | A61K 49/0052 424/9.6 |
| 2015/0357496 | A1 * | 12/2015 | Kimoto | C09K 11/881 252/519.4 |
| 2015/0362500 | A1 * | 12/2015 | Anker | G01N 23/223 600/431 |
| 2016/0250612 | A1 * | 9/2016 | Oldenburg | B01J 13/20 428/404 |
| 2017/0168037 | A1 | 6/2017 | Moore et al. | |
| 2018/0106785 | A1 | 4/2018 | Landfester et al. | |
| 2018/0277720 | A1 * | 9/2018 | Zheng | C09K 11/0883 |
| 2018/0303959 | A1 * | 10/2018 | Jang | A61K 49/0002 |
| 2018/0311353 | A1 * | 11/2018 | Kohane | A61K 31/409 |
| 2018/0313501 | A1 * | 11/2018 | Anc | H10H 20/8583 |
| 2018/0313750 | A1 | 11/2018 | Greene et al. | |
| 2019/0085237 | A1 * | 3/2019 | Miteva | G01N 21/6428 |
| 2019/0097101 | A1 * | 3/2019 | Dorman | C09K 11/025 |
| 2019/0169495 | A1 * | 6/2019 | Vadrucci | C09K 11/06 |
| 2019/0233724 | A1 * | 8/2019 | Kim | C03C 3/095 |
| 2019/0275151 | A1 * | 9/2019 | Campos | A61K 41/0071 |
| 2019/0345269 | A1 * | 11/2019 | Castellano | B01J 35/39 |
| 2020/0172559 | A1 * | 6/2020 | Han | A61K 47/6923 |
| 2020/0308484 | A1 * | 10/2020 | Jang | A61K 49/1818 |
| 2021/0228719 | A1 * | 7/2021 | Wang | A61K 47/6907 |
| 2021/0236652 | A1 * | 8/2021 | Kohane | A61P 27/02 |
| 2021/0311037 | A1 * | 10/2021 | Fine | G01N 33/56983 |
| 2022/0025255 | A1 * | 1/2022 | Congreve | B29C 64/165 |
| 2022/0040657 | A1 * | 2/2022 | Czaplewski-Campbell | B42D 25/387 |
| 2022/0040682 | A1 * | 2/2022 | Kobilka | B01J 31/183 |
| 2022/0041925 | A1 * | 2/2022 | Kobilka | B01J 13/14 |
| 2022/0284131 | A1 * | 9/2022 | Campbell | C09D 5/32 |
| 2022/0305724 | A1 * | 9/2022 | Congreve | B29C 64/106 |

FOREIGN PATENT DOCUMENTS

| | | |
|---|---|---|
| CN | 111057174 B | 3/2022 |
| JP | 11152416 A | 6/1999 |
| KR | 101754777 B1 | 7/2017 |
| WO | 2010098002 A1 | 9/2010 |
| WO | 2014051393 A1 | 4/2014 |
| WO | 2017127717 A1 | 7/2017 |

OTHER PUBLICATIONS

"Pd Porphyrin—Various Alkoxy Functionalities," SciFinder Results, Received: Aug. 29, 2019, 16 pages.
"Perylene Suzuki Reactions," SciFinder Results, Received: Aug. 29, 2019, 24 pages.
"Pt—Bonds Alternated," SciFinder Results, Received: Aug. 29, 2019, 3 pages.
"Pt—TP TNP," SciFinder Results, Received: Aug. 29, 2019, 3 pages.
"Pt Porphyrins with Some Functionalities," SciFinder Results, Received: Aug. 29, 2019, 21 pages.
Ashby et al., "Organometallic Reaction Mechanisms. 17. Nature of Alkyl Transfer in Reactions of Grignard Reagents with Ketones. Evidence for Radical Intermediates in the Formation of 1,2-Addition Product Involving Tertiary and Primary Grignard Reagents," Journal of the American Chemical Society, 1981, 103, pp. 2242-2250.
Basu et al., "Regioselective 5-exo-Trig Heterocyclization of 2-Allyl-1-naphthols under the Influence of N-Iodosuccinimide or Molecular Iodine in Aqueous Micelle," Research Article, Organic Chemistry International, 2012, Article ID 810476, 7 pages, Hindawi Publishing Corporation, doi:10.1155/2012/810476.
Bhunia et al., "Supporting Information for: Conjugated microporous polymer based visual sensing platform for aminoglycoside antibiotic in water," Electronic Supplementary Material (ESI) for ChemComm., 2018, pp. 1-24.
Caruso et al., "Microcapsules containing suspensions of carbon nanotubes," Journal of Materials Chemistry, Aug. 2009, vol. 19, pp. 6093-6096, DOI: 10.1039/b910673a.
Chen et al., "Electrochemistry of Platinum(II) Porphyrins: Effect of Substituents and π-Extension on Redox Potentials and Site of Electron Transfer," Inorganic Chemistry, 2012, 51, pp. 6200-6210, ACS Publications.
Katoueizadeh et al., "Morphological study of surface-modified urea—formaldehyde microcapsules using 3-aminopropyltriethoxy silane," Polymer Bulletin, 2019, (76)1317-1331, https://doi.org/10.1007/s00289-018-2425-8.
Kirchhoff et al., "Boronic Acids: New Coupling Partners in Room-Temperature Suzuki Reactions of Alkyl Bromides. Crystallographic Characterization of an Oxidative-Addition Adduct Generated under Remarkably Mild Conditions," Journal of the American Chemical Society, Nov. 2002, 124(46), pp. 13662-13663.
Kobilka et al., "Light Upconversion Microcapsule Shells," U.S. Appl. No. 16/987,878, filed Aug. 7, 2020.
Lebedev et al., "Dendritic Phosphorescent Probes for Oxygen Imaging in Biological Systems," Applied Materials & Interfaces, vol. 1, No. 6, 2009, pp. 1292-1304.
Lebedev et al., "Dendritic Phosphorescent Probes for Oxygen Imaging in Biological Systems," Supporting Information, 2009, 144 pages.
List of IBM Patents or Patent Applications Treated as Related, Aug. 6, 2020, 2 pgs.
Lv et al., "Helical Fibrous Nanostructures Self-Assembled from Metal-Free Phthalocyanine with Peripheral Chiral Menthol Unites," ChemPhysChem, vol. 10, Issue 15, Oct. 19, 2009, pp. 2725-2732 (Abstract only).

(56) References Cited

OTHER PUBLICATIONS

Markon, I., "Counterfeit Prevention of Microelectronics through Covert Anti-Tamper Microcapsules," South Dakota School of Mines and Technology Research Experience for Undergraduates, Summer 2013, pp. 1-38.

Ravetz et al., "Photoredox catalysis using infrared light via triplet fusion upconversion," Nature, Jan. 17, 2019, vol. 565, pp. 343-346, https://doi.org/10.1038/s41586-018-0835-2.

Stober et al., "Controlled growth of monodisperse silica spheres in the micron range," Journal of Colloid and Interface Science, vol. 26, Issue 1, Jan. 1968, pp. 62-69, https://doi.org/10.1016/0021-9797(68)90272-5.

Tran et al., "A Perylene-Based Microporous Coordination Polymer Interacts Selectively with Electron-Poor Aromatics," Chemistry A European Journal, vol. 22, Issue 16, Apr. 11, 2016, pp. 5509-5513 (Abstract only).

West et al. (Eds), "Advances in Organometallic Chemistry," vol. 51, pp. 271-272.

\* cited by examiner

US 12,357,978 B2

LIGHT UPCONVERSION MICROCAPSULES

BACKGROUND

The present disclosure relates to materials for triplet fusion light upconversion and, more specifically, to light upconversion microcapsules having molecular sensitizer and annihilator core solutions.

Photoredox-catalyzed reactions require single electron transfer mediated by a photocatalyst. The photocatalyst can carry out this electron transfer when in an excited state caused by absorption of a photon. The amount of energy required to reach the redox-active excited state varies amongst photocatalysts, but generally wavelengths of light ranging from visible to ultraviolet (UV) must be absorbed. For example, some organic dyes are excited to a redox active state by absorption of yellow light, and some transition metal complexes are excited to a redox active state by absorption of blue light. These organic dyes and transition metal complexes can, therefore, act as photocatalysts when exposed to yellow or blue light, respectively.

SUMMARY

Various embodiments are directed to a microcapsule that includes a transparent shell encapsulating a mixture that includes light upconversion molecules. The light upconversion molecules can include a molecular sensitizer (e.g., a transition metal complex of a porphyrin or a transition metal complex of palladium) and a molecular annihilator (e.g., furanyldiketopyrrolopyrrole or a perylene). In some embodiments, the mixture also includes a non-polar solvent. The transparent shell can be a urea-formaldehyde shell.

Additional embodiments are directed to a method of forming a microcapsule that includes obtaining light upconversion molecules, forming an emulsion of the light upconversion molecules and a shell formation solution, and encapsulating the light upconversion molecules in a transparent shell. The light upconversion molecules can include a molecular sensitizer (e.g., palladium(II) octabutoxyphthalocyanine or platinum(II) tetraphenyltetranaphthoporphyrin) and a molecular annihilator (e.g., furanyldiketopyrrolopyrrole or a perylene). The method can also include forming a reaction system that includes the microcapsule, a photocatalyst (e.g., a cationic transition metal complex), and a substrate (e.g., an organic molecule), and exposing this system to light having sufficient energy to excite the molecular sensitizer to a singlet excited state. In some embodiments, the shell formation solution comprises water and urea, and the encapsulating can include adding formaldehyde to the emulsion.

Further embodiments are directed to an article of manufacture that includes a transparent shell encapsulating a mixture that includes light upconversion molecules. The article of manufacture can also include a photocatalyst. The light upconversion molecules can include a molecular sensitizer and a molecular annihilator. The transparent shell can be a urea-formaldehyde shell.

DETAILED DESCRIPTION

Figure 1:
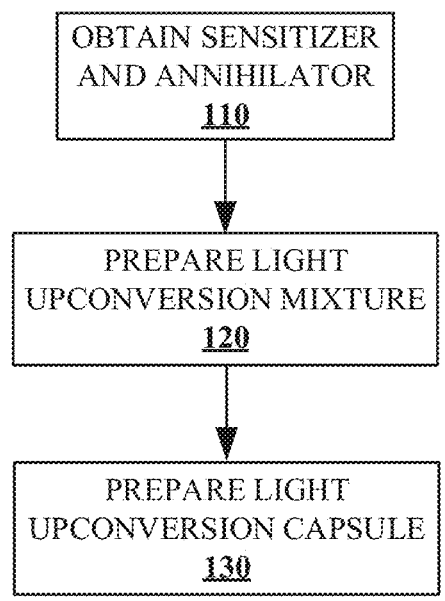
FIG. 1 is a flow diagram illustrating a process of forming a light upconversion microcapsule, according to some embodiments of the present disclosure.

Light conversion devices are used to convert light (e.g., from solar radiation and/or artificial light sources) into electrical or chemical energy. For example, solar conversion devices can include photocatalysts that absorb solar radiation at the earth's surface. Solar radiation includes ultraviolet (UV) light (~115 nm-380 nm), visible light (~380-750 nm), and near-infrared (NIR) light (~750 nm-2500 nm). The majority of this radiation is in the visible (~41%) and NIR (~42%) regions of the electromagnetic spectrum. The remainder of the solar radiation is primarily UV light (~6%) and mid-infrared light (~1%).

The light absorbed by a photocatalyst in a light conversion device can excite a photocatalyst to a higher energy level ("excited state"), which allows the photocatalyst to donate an electron to a substrate (e.g., a reactant in a photocatalyzed reaction). Most photocatalysts require UV or visible light to transition to an excited state. UV and visible light provide energy ranging from about 50-80 kcal mol$^{-1}$. However, NIR light can only provide energy up to about 35 kcal mol$^{-1}$, which is insufficient for exciting most photocatalysts to the state necessary for single electron transfer (SET). This means that only about half of the energy from solar radiation is available for photocatalytic conversion to chemical and electrical energy. Additionally, the ability of UV and visible light to penetrate most reaction media is much lower than that of NIR light. This can limit the efficacy of UV and visible light in large-scale photocatalyzed reactions.

However, there are techniques for generating visible light by upconverting red or NIR light via triplet fusion. In triplet fusion, there are two molecular species: a sensitizer ([Sen]) and an annihilator ([An]). The sensitizer absorbs a low-energy photon in order to transition to a singlet excited state ($^1$[Sen]*). Herein, "low-energy photon" refers to a photon in the NIR or red region of the electromagnetic (EM) spectrum (e.g., above about 700 nm) unless otherwise specified. The specific low-energy photon wavelength(s) required to excite [Sen] to $^1$[Sen]* depends upon the type of molecular sensitizer. This is discussed in greater detail below.

$^1$[Sen]* molecules decay into triplet excited state ($^3$[Sen]*) molecules, and the $^3$[Sen]* molecules transfer their energy to [An] molecules, resulting in triplet excited state annihilator ($^3$[An]*) molecules. Pairs of $^3$[An*] molecules then undergo triplet fusion, resulting in one of each pair transitioning to a higher energy singlet excited state ($^1$[An]*). Molecules of $^1$[An]* decay via fluorescence, emitting higher energy photons than the low-energy photons absorbed by molecules of [Sen]. The higher energy photons can be in the visible spectrum. The energy of the emitted photons can be tuned by the selection of [Sen]/[An] pairs. Various organic and metal-complex chromophores can be used as sensitizers and annihilators. Examples of these compounds are discussed in greater detail below.

There is potential for the use of [Sen]/[An] triplet fusion upconversion in photocatalytic systems. For example, photocatalysts can be excited by visible light generated by the triplet fusion upconversion. This can allow the energy from NIR solar radiation to be harnessed for photoredox reactions. However, the use of [Sen]/[An] pairs is limited by the availability of techniques for packaging and incorporating these species into reaction environments for various applications. Therefore, there is a need for new materials that can facilitate the use of NIR-to-visible light upconversion in a variety of photoredox reaction environments.

Light upconversion microcapsules having molecular sensitizer and/or annihilator cores are disclosed herein. These microcapsules have transparent shells surrounding a core solution or suspension of light upconversion molecules (e.g., a mixture of [Sen] and [An]) are disclosed. Herein, "transparent" refers to materials (e.g., shell polymers, core solvents, etc.) though which appropriate wavelengths of visible and NIR light can pass. Appropriate wavelengths include, at least, NIR light or other low-energy photons having sufficient energy to excite [Sen] to $^1$[Sen]* and wavelengths of light emitted by fluorescent decay of $^1$[An]* (e.g., visible light). In some embodiments, additional wavelengths (e.g., between about 100 nm-2500 nm and, optionally, wavelengths extending above and below this range) can pass through the transparent materials as well. It should be noted that, while the materials herein are described as transparent, translucent shell materials can be used in some embodiments. The visible-light-emitting microcapsules disclosed herein can be used in a variety of applications, such as anticounterfeiting, solar cells, security tagging, polymerization, purification systems, etc.

Figure 2:
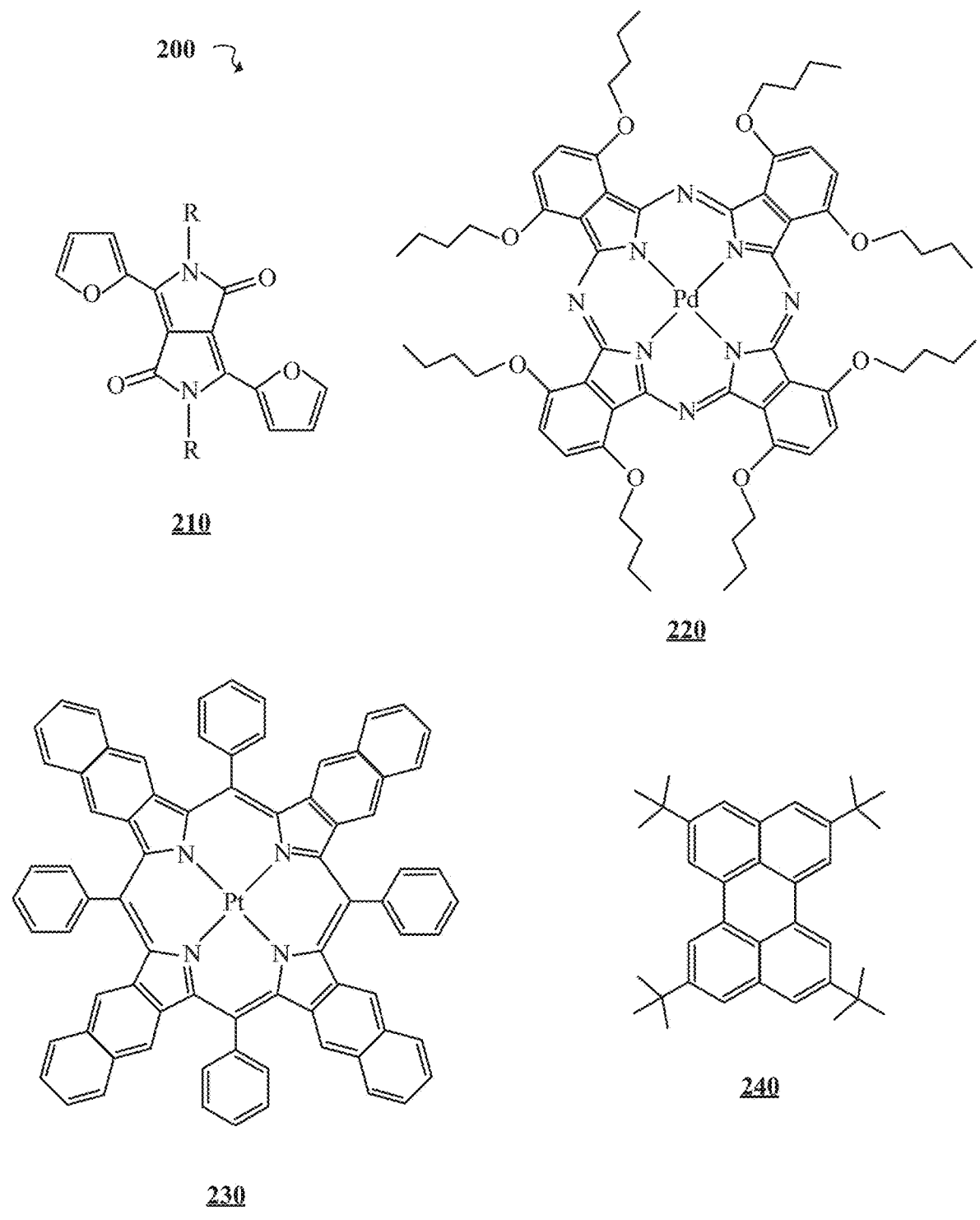
FIG. 2 is a chemical structure diagram illustrating examples of molecular annihilators and sensitizers, according to some embodiments of the present disclosure.

FIG. 1 is a flow diagram illustrating a process 100 of forming a light upconversion microcapsule, according to some embodiments of the present disclosure. A sensitizer ([Sen]) and an annihilator ([An]) are obtained. This is illustrated at step 110. Herein, [Sen] and [An] are also referred to as "light upconversion molecules". Examples of sensitizers can include molecular compounds having high absorption coefficients in the NIR and/or red regions of the electromagnetic spectrum. In some embodiments, the sensitizer is a metal complex (e.g., a transition metal complex of a porphyrin or phthalocyanine). The annihilator can be an organic chromophore. In some embodiments, the annihilator is an organic compound having a high fluorescence quantum yield (e.g., about 0.9-0.95, 0.8-0.99, 0.6-1, etc.). Examples of light upconversion molecules that can be used are illustrated in FIG. 2.

Any appropriate sensitizer/annihilator pair can be selected. The pair can be selected based on the wavelength of light that can be absorbed by [Sen] and/or the wavelength of light emitted by $^1$[An]* upon fluorescent decay. For example, in instances where a reaction requires a photocatalyst that absorbs yellow light, an appropriate sensitizer can be paired with an annihilator where decay of $^1$[An]* emits yellow light. Examples of photocatalysts, sensitizers, and annihilators that can be used are discussed in greater detail below. In some embodiments, an annihilator is paired with a sensitizer where the energy of $^3$[Sen]* is slightly higher than that of $^3$[An]. However, any sensitizer where $^3$[Sen]* can transfer sufficient energy to excite [An] to $^3$[An] can be used. Additional factors that can be considered in choosing a [Sen]/[An] pair can include solubility, reactivity, efficiency, etc.

The annihilator can be selected based on its triplet state energy and wavelength of fluorescent emission. For example, when a photoredox reaction is catalyzed by [Ru (bpy)3]$^{2+}$, an annihilator where the decay of $^1$[An]* emits blue light can be selected. This annihilator can be paired with a sensitizer where the energy of $^3$[Sen]* is slightly higher than that of $^3$[An]. However, any sensitizer where $^3$[Sen]* can transfer sufficient energy for exciting [An] to $^3$[An] can be used in some embodiments. Additional factors that can be considered in choosing [An] and [Sen] can include solubility, reactivity, efficiency, etc.

A light upconversion molecular mixture is then formed. This is illustrated at step 120. The sensitizer and/or annihilator can be dissolved in a solvent or suspended in a transparent material (e.g., a non-solvent liquid, an oil, a gel, etc.) such as propylene carbonate. Solvents that can be used to form a [Sen]/[An] solution can include aromatic solvents such as chlorobenzene (PhCl) and ethyl phenylacetate (EPA), non-aromatic solvents such as chloroform, and solvent mixtures such as trifluorotoluene/acetonitrile.

Figure 3A:
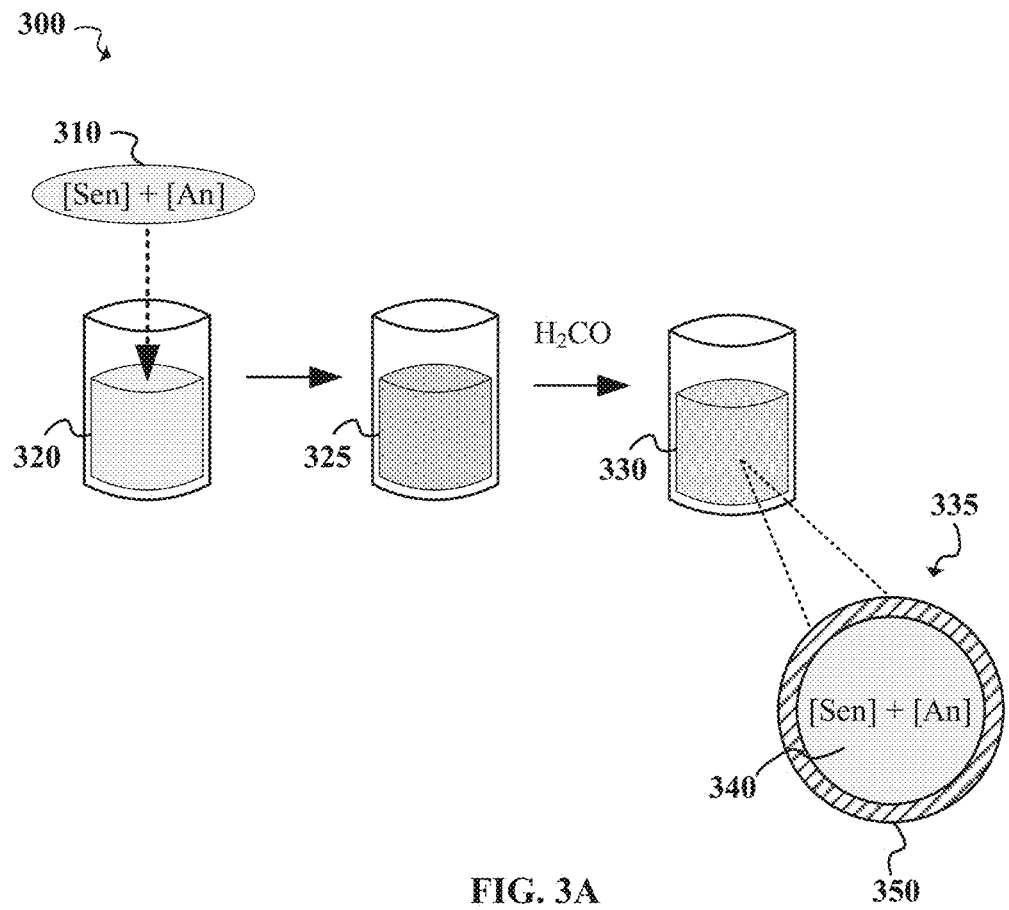
FIG. 3A is a schematic diagram illustrating a process of forming light upconversion microcapsules, according to some embodiments of the present disclosure.

In some embodiments, the concentration of [Sen] can range from approximately 0.003 mol %-0.18 mol %, and the concentration of [An] can range from approximately 3 mol %-10 mol %. However, other concentrations can be used. For example, the concentration of [Sen] can range from approximately 0.0001 mol %-0.003 mol %, and the concentration of [An] can range from approximately 0.18 mol %-3 mol % in some embodiments. The concentrations of [Sen] and [An] can vary depending upon solubility, type of photoredox reaction, wavelength of light for generating $^1$[Sen]*, absorption coefficient, etc. An example [Sen]/[An] mixture is illustrated in FIG. 3A.

Light upconversion microcapsules are then formed. This is illustrated at step 130. The light upconversion microcapsules have transparent shells encapsulating droplets of the light upconversion mixture. In some embodiments, the light upconversion mixture can be sonicated (e.g., for 30 min at 40 Hz) to increase dispersion prior to forming the shells. In other embodiments, the mixture is not sonicated. The mixture can be stirred in various embodiments. The light upconversion mixture is combined with shell-forming components in an emulsion. For example, when a urea-formaldehyde (UF) shell is to be formed, the light upconversion mixture can be added to a solution of the shell-forming components water and urea. The emulsion can also include stabilizers, emulsifying agents, etc.

When the emulsion has stabilized, at least one additional shell-forming reactant (e.g., an additional monomer, a radical initiator, a curing agent, etc.) can be added, resulting in polymerization of the shell-forming reactants to form transparent shells around the droplets of the light upconversion mixture in the emulsion. In instances where the emulsion includes a water/urea solution, the next shell-forming reactant can be formaldehyde, resulting in polymerization to form a UF microcapsule shell. Variations on these UF shell components can be used as well. For example, aldehydes other than formaldehyde can be used in some embodiments. In some embodiments, resorcinol is included in the UF shell formation. Additionally, shells made of other transparent polymers can be used some in other embodiments. For example, microcapsule shells made from poly(acrylic acid) or polymethyl methacrylate can be formed using reaction conditions known to those of ordinary skill in the art. Examples of an emulsion and a light upconversion microcapsule are illustrated in FIG. 3A.

In some embodiments, the light upconversion microcapsules include droplets of both [Sen] and [An] molecules. However, light upconversion microcapsules having only sensitizers or only annihilators can be prepared in other embodiments. In these instances, the encapsulated [Sen] or [An] can interact with light upconversion molecules ([An] or [Sen], respectively) from adjacent microcapsules, in a solution in which the microcapsule is suspended, or from other sources in order to carry out light upconversion.

FIG. 2 is a chemical structure diagram 200 illustrating examples of molecular annihilators and sensitizers, according to some embodiments of the present disclosure. These compounds can be selected at step 110 of process 100 (FIG. 1) in some embodiments. The illustrated compounds are a furanyldiketopyrrolopyrrole (FDPP) 210 having alkyl groups (e.g., methyl, ethyl, propyl, ethylhexyl, t-butyl, etc.) represented by R, palladium(II) octabutoxyphthalocyanine (PdPc(OBu)$_8$) 220, platinum(II) meso-tetraphenyltetranaphthoporphyrin (PtTPTNP) 230, and 2,5,8,11-tetra-tert-butylperylene (TTBP) 240. FDPP 210 and TTBP 240 are annihilators, and PdPc(OBu)$_8$ 220 and PtTPTNP 230 are sensitizers. Other sensitizers and annihilators can be used in some embodiments. Further examples of sensitizers and annihilators are discussed in greater detail with respect to FIG. 3A.

For example, a PdPc(OBu)$_8$/FDPP system can upconvert NIR light (e.g., at wavelengths greater than about 700 nm) to visible light of about 530 nm to 630 nm. Therefore, microcapsules containing a mixture of PdPc(OBu)$_8$ 220 and FDPP 210 can be used to activate photocatalysts that require yellow (e.g., ~560 nm-590 nm) and/or green (e.g., ~520 nm-560 nm) light. Examples of these photocatalysts can include organic compounds such as eosin Y (2',4',5',7'-tetrabromofluorescein) and rose bengal (4,5,6,7-tetrachloro-2',4',5',7'-tetraiodofluorescein). However, many photocatalysts (e.g., [Ru(bpy)$_3$]$^{2+}$ and other transition metal complexes) require higher energy light (e.g., blue or UV) for excitation. In these instances, microcapsules containing other sensitizer/annihilator pairs can be used. For example, PtTPTNP/TTBP systems can upconvert NIR light to blue light (e.g., $\lambda_{max}$=~450 nm).

In some embodiments, sensitizers and annihilators other than those illustrated in FIG. 2 are used. Additional examples of annihilators that can be used in some embodiments can include rubrene (5,6,11,12-tetraphenylnapthacene), 9,10-diphenylanthracene, 9,10-bis(phenylethynyl)anthracene, 2,5-diphenyloxazole, 9,10-disubstituted anthracenes, diketopyrrolopyrroles, perylenes, etc. Examples of sensitizers can include molecular compounds having high absorption coefficients in the NIR and/or red regions of the electromagnetic spectrum. However, any molecular compound capable of absorbing a photon and transferring triplet excitation energy to an annihilator can be selected. In some embodiments, the sensitizer is a transition metal (e.g., Pt, Pd, Zn, Cu, Co, Ru(CO), etc.) complex of a β- and/or meso-substituted porphyrin (e.g., 2-(3-[10,15,20-tris(3,5-di-tert-butylphenyl)porphyrin-5-yl]phenoxy)ethanol, octaethylporphyrin, tetrabenzoporphyrin, tetranaphthoporphyrin, tetraanthraporphyrin, tetraphenyltetrabenzoporphyrin, tetraphenyltetraanthraporphyrin, etc.). In addition to porphyrins, transition metal complexes of substituted or unsubstituted phthalocyanines (e.g., octabutoxyphthalocyanine, octa-triethyleneoxysulfonyl phthalocyanine, etc.) can be used.

However, any appropriate (e.g., based on absorption coefficient, excited state energies, solubility, etc.) sensitizer can be used. Sensitizers can be selected based on factors such as excited state energy, lifetime of excited state, absorption coefficient in solution, solubility, reaction components (e.g., photocatalyst, type of photoredox reaction, annihilator, shell material, refractive indices of surrounding media, etc.), etc. Examples of sensitizers can also include transition metal complexes of macrocyclic compounds such as naphthalocyanines, chlorins, and other cyclic tetrapyrroles. Further, sensitizers can include fused ring systems that include more than one porphyrin, phthalocyanine, and/or other macrocyclic compound. In some embodiments, sensitizers can be metal-free macrocyclic compounds such as porphyrins, phthalocyanines, naphthalocyanines, chlorins, etc., or organic dyes such as purpurin.

FIG. 3A is a schematic diagram illustrating a process 300 of forming light upconversion microcapsules, according to some embodiments of the present disclosure. A mixture of a light upconversion molecules ([Sen] and/or [An]) is prepared. The mixture can be a solution or a suspension of the light upconversion molecules. In process 300, the mixture is referred to as a core component 310. The core component 310 can include a [Sen]/[An] pair dissolved in a non-polar solvent such as PhCl or EPA. The concentrations of the sensitizer and the annihilator in the core component 310 can vary (see FIG. 1). The core component 310 can be a solution of a sensitizer and an annihilator such as those illustrated in FIG. 2 (e.g., PdPc(OBu)$_8$/FDPP or PtTPTNP/TTBP), though other [Sen]/[An] pairs can be selected (e.g., PdPc(OBu)$_8$/rubrene).

A shell formation solution 320 is prepared as well. In some embodiments, the shell formation solution 320 is an aqueous solution of ethylene-maleic anhydride (EMA) copolymer (~2.5-5 wt % EMA), urea (~2.5 wt %), ammonium chloride (~0.25 wt %), and resorcinol (~0.25 wt %). The pH of the solution 320 is then adjusted to about 3.5 (e.g., by addition of concentrated HCl$_{(aq)}$ and/or 10 wt % NaOH$_{(aq)}$). In some embodiments, approximately 1-2 drops of 1-octanol can be added to the shell formation solution 320 to eliminate surface bubbles.

A slow stream of the core component 310 is then added to the shell formation solution 320 (e.g., to a concentration of about 60 vol% core component 310) to form an emulsion 325. Addition of the core component 310 to the shell formation solution 320 results in an emulsion 325 containing droplets of core component 310 dispersed in the shell formation solution 320. The emulsion 325 is allowed to stabilize for approximately 10 minutes. A polymerizing agent is then added to the emulsion 325. In process 300, the polymerizing agent is formaldehyde (H$_2$CO). For example, formalin (37 w/v % H$_2$CO in water) can be added to the emulsion 325 to obtain an approximately 1:2 ratio of formaldehyde to urea. The emulsion 325 is then heated to about 55° C. (e.g., at a rate of about 1° C./min), and allowed to react for about four hours under continuous agitation.

During shell formation, the sizes of the light upconversion microcapsules can be controlled using a variety of well-known size control techniques. Examples of these techniques include adjusting reaction parameters such as pH, temperature, stir speed, reaction time, solvent(s), concentration of reactants, etc. In some embodiments, the microcapsules have size distributions within the micron range (e.g., about 1 μm-10 μm, 10 μm-100 μm, 250 μm-500 μm, 100 μm-1000 μm). However, microcapsules of other sizes can be formed (e.g., about 10 nm-10 mm).

The reaction results in polymerization of the urea and formaldehyde to form a suspension 330 of microcapsules having UF polymer shells encapsulating droplets of [Sen]/[An] core component 310. The suspension 330 is filtered to obtain the microcapsules, which can then be rinsed with water and dried (e.g., in air for about 24 h-48 h). A cross-sectional view of a microcapsule 335 from the suspension 330 is illustrated. The microcapsule 335 includes a core 340 containing the sensitizer and annihilator mixture (core component 310). The core 340 is encapsulated by a transparent UF polymer shell 350. The [Sen]/[An] pair in the core 340 can generate visible light via triplet fusion upconversion of lower energy photons.

Figure 3B:
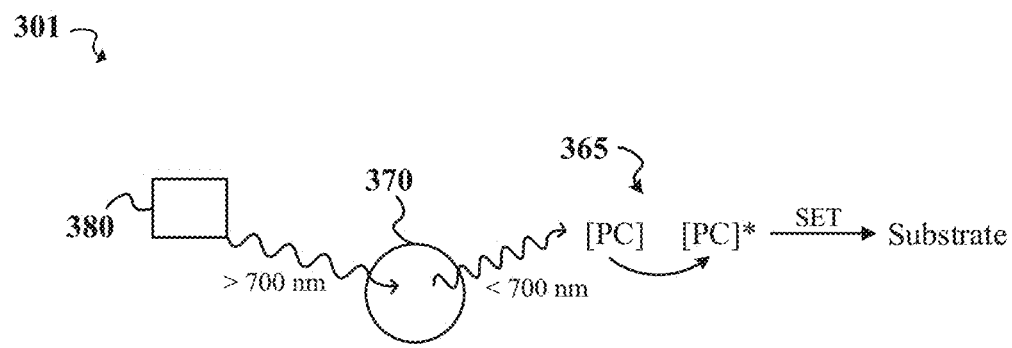
FIG. 3B is a schematic diagram illustrating a photocatalyzed reaction environment, according to some embodiments of the present disclosure.

FIG. 3B is a schematic diagram illustrating a photocatalyzed reaction environment 301, according to some embodiments of the present disclosure. The photocatalyzed reaction includes excitation of a photocatalyst 365 by light upconverted using light upconversion molecules encapsulated in a transparent microcapsule 370. This light upconversion microcapsule 370 can be formed in process 300 (FIG. 3A). The light upconversion microcapsule 370 includes a transparent shell surrounding a [Sen]/[An] core solution (e.g., core 340 and shell 350, illustrated in FIG. 3A). However, in other embodiments the microcapsule 370 may encapsulate only [Sen] or only [An]. In these instances, [Sen] or [An] in the microcapsule 370 can be paired with light upconversion molecules ([An] or [Sen], respectively) from another microcapsule, in solution, or another source.

The light upconversion microcapsule 370 can be suspended in a reaction mixture that contains the photocatalyst 365 and a substrate (e.g., organic molecules). In some embodiments, the light upconversion microcapsule 370 is separated from the reaction mixture, but located in close enough proximity to the photocatalyst 365 to allow the photocatalyst 365 to absorb photons emitted from the microcapsule 370 core. While only one light upconversion microcapsule 370 is illustrated in FIG. 3B, it should be understood that reaction environment 301 can contain any appropriate number of substantially similar light upconversion microcapsules. The number of light upconversion microcapsules can depend on attributes of the photocatalyzed reaction mixture (e.g., volume, concentration of reactants and/or photocatalyst 365, type of reactants/substrate, solvent, etc.). If the microcapsule core 340 includes only [Sen] or only [An], additional microcapsules with [An] or [Sen] cores, respectively, can be included.

The microcapsule 370 is exposed to low-energy photons (e.g., wavelengths greater than about 700 nm) from a light source 380. In some embodiments, the light source can also emit higher energy light (e.g., visible, ultraviolet, etc.). The low energy photons are absorbed and upconverted by the light upconversion molecules in the microcapsule 370. The resulting higher energy photons are emitted from the microcapsule 370, and absorbed by the photocatalyst 365 in its ground state [PC]. The photocatalyst 365 can then transition to a redox-active excited state ([PC]*), followed by single electron transfer (SET) from [PC]* to a substrate.

Examples of photocatalysts 365 that can be used can include complexes of transition metals such as ruthenium and iridium. Ruthenium photocatalysts can include [Ru(bpy)]$^{2+}$ (tris(2,2'-bipyridine)ruthenium(II)), [Ru(phen)$_3$]$^{2+}$ (tris(1,10-phenanthroline)ruthenium(II)), [Ru(bpz)$_3$]$^{2+}$(tris (2,2'-bipyrazine)ruthenium(II)), iridium photocatalysts (e.g., dichlorotetrakis(2-(2-pyridinyl)phenyl)diiridium(III), Ir[p-F (t-Bu)-ppy]$_3$ (tris(2-(3-tert-butylphenyl)-4-tert-butylpyridine)iridium), Ir(ppy)$_3$ (tris[2-phenylpyridinato-C$^2$,N] iridium(III)), etc.), acridinium photocatalysts (e.g., 2,7-dibromo-10-methylacridone, 2,7-dibromo-mesityl-10-methylacridinium tetrafluoroborate, etc.), and organic photocatalysts such as rose bengal, 3DPA2FBN (2,4,6-tris (diphenylamino)-3,5-difluorobenzonitrile), 5,10-di(2-naphthyl)-5,10-dihydrophenazine, eosin Y, etc. However, any appropriate photocatalysts can be used. Additional examples can include tetra-n-butylammonium decatungstate, copper catalysts (e.g., Cu(dap)$_2$Cl, where dap=2,9-bis(p-anisyl)1, 10-phenanthroline), metal oxides (e.g., ZnO, TiO$_2$, WO$_3$, ZrO$_2$, etc.), metal sulfides (e.g., CdS), semiconductors, etc.

The substrate can be a molecule in a photocatalyzed reaction. For example, blue light generated by a [Sen]/[An] pair (e.g., PtTPTNP/TTBP, illustrated in FIG. 2) can be used to promote [Ru(bpy)$_3$]$^{2+}$-catalyzed processes such as intramolecular [2+2] cyclization of enones, vinyl azide reduction (e.g., to form pyrroles), and radical polymerization (e.g., to form polymethylmethacrylate). It should be noted that [Ru (bpy)$_3$]$^{2+}$ can be replaced with any appropriate photoredox catalyst (e.g., iridium(III) photocatalysts or other ruthenium (II) photocatalysts) that absorbs blue light, as is understood by persons of ordinary skill in the art.

In some embodiments, compounds disclosed herein can have additional moieties such as epoxides, hydroxyl, propylene carbonate, alkyl halides, esters, alkynes, amines, isocyanates, acid chlorides, chloroformates, thiols, oxiranes, silyls, carboxylic acids, alkoxyls, alkyls, etc. Herein, "alkyl" refers to $C_1$-$C_{100}$ radicals, which can be linear, branched, or cyclic. Examples of alkyl groups can include methyl, ethyl, n-propyl, iso-propyl, n-butyl, iso-butyl, sec-butyl, tert-butyl, pentyl, hexyl, octyl, cyclopropyl, cyclobutyl, cyclopentyl, cyclohexyl, and cyclooctyl. In some embodiments, the alkyls are unsaturated (e.g., alkenes and alkynes).

The compounds described herein can contain one or more chiral centers. Unless otherwise noted, the disclosed structures cover all stereoisomers, conformers, rotamers, isomers, and enantiomers of the represented compounds. Further, polymers or other materials containing the disclosed compounds can include racemic forms of the compounds in addition to individual stereoisomers, as well as mixtures containing any of these. Substituents on the compounds described herein may participate in additional chemical reactions, transformations, or interactions, which can include synthesis, decomposition, single and/or double replacement, oxidation/reduction, acid/base, nucleophilic, electrophilic and radical substitutions, addition/elimination reactions, cros slinking reactions, and polymerization reactions.

Where isomers of a named alkyl, alkenyl, alkoxy, aryl, or other functional group exist (e.g., n-butyl, iso-butyl, sec-butyl, and tert-butyl), reference to a member of the group without specifying a particular isomer (e.g., butyl) is intended to include all isomers in the family (e.g., n-butyl, iso-butyl, sec-butyl, and ten-butyl). Further, unless specified otherwise, reference to one member of the group (e.g., n-butyl) includes the remaining isomers in the family (e.g., iso-butyl, sec-butyl, and tert-butyl).

Where different salts of a compound, such as a transition metal complex, exist (e.g., [Ru(bpy)$_3$]Cl$_2$ and [Ru(bpy)$_3$ [PF$_6$]$_2$), reference to the compound as an ion (e.g., [Ru (bpy)$_2$]$^{2+}$ or tris(2,2'-bipyridine)ruthenium(II)) without specifying a counterion (e.g., dichloride or dihexafluorophosphate) is intended to include any available salts of the complex. Further, unless specified otherwise, reference to one counterion (e.g., Cl$^-$) refers to any other appropriate counterion (e.g., PF$_6^-$) for the compound.

Unless otherwise noted, chemical reactions are performed at ambient conditions or under slight heating with no special atmosphere or head space, and may be performed using standard organic solvents to manage mix properties such as viscosity and flow index. Standard procedures for quenching reactions, solvent removal, and purification are performed. Room temperature is between about 15° C. and 30° C. unless otherwise indicated. Ranges (e.g., time, concentration, temperature, etc.) indicated herein include both endpoints and all numbers between the endpoints. Unless specified otherwise, the use of "about," "approximately," or a tilde (~) in connection with a range applies to both ends of the range (e.g., "approximately 1 g-5 g" should be interpreted as "approximately 1 g—approximately 5 g"), and in connection with a list of ranges applies to each range in the list (e.g., "about 1 g-5 g, 5 g-10 g, etc." should be interpreted as "about 1 g—about 5 g, about 5 g—about 10 g, etc."). Unless otherwise indicated, modifying terms such as "about," "approximately," and "~" indicate +/−10% of a recited value, range of values, or endpoints of one or more ranges of values.

The processes discussed herein, and their accompanying drawings, are not to be construed as limiting. One skilled in the art would recognize that a variety of techniques may be used that vary in conditions, components, methods, etc., which ultimately generate light upconversion microcapsules. In addition, the conditions can optionally be changed over the course of a process. Further, in some embodiments processes can be added, omitted, or carried out in alternate orders, while still remaining within the scope of the disclosure, as will be understood by a person of ordinary skill in the art. It should also be noted that processes can be carried out by a single entity, or by multiple entities. For example, a first entity may prepare the light upconversion microcapsules, and a second entity may carry photocatalytic reactions.

What is claimed is:

1. A microcapsule, comprising:
   a transparent shell encapsulating a mixture, wherein:
     the mixture comprises a molecular sensitizer and a molecular annihilator that, in combination, are able to produce visible light in response to electromagnetic radiation with a wavelength greater than 800 nm;
     the molecular sensitizer and the molecular annihilator are suspended in a transparent material selected from the group consisting of a non-solvent liquid, an oil, and a gel; and
     the microcapsule has a size greater than 5 μm.

2. The microcapsule of claim 1, wherein the transparent shell is a urea-formaldehyde shell.

3. The microcapsule of claim 1, wherein the molecular annihilator is selected from the group consisting of a furanyldiketopyrrolopyrrole and a perylene.

4. The microcapsule of claim 1, wherein the molecular sensitizer is palladium (II) octabutoxyphthalocyanine and the molecular annihilator is furanyldiketopyrrolopyrrole.

5. The microcapsule of claim 1, wherein the microcapsule has a size greater than 10 μm.

6. The microcapsule of claim 1, wherein the molecular sensitizer is a metal-free macrocyclic compound.

7. The microcapsule of claim 6, wherein the molecular sensitizer is selected from the group consisting of a porphyrin, a phthalocyanine, a naphthalocyanine, and a chlorin.

8. The microcapsule of claim 1, wherein the molecular sensitizer is selected from the group consisting of a transition metal complex of a porphyrin and a transition metal complex of a phthalocyanine.

9. The microcapsule of claim 8, wherein the porphyrin is selected from the group consisting of 2-(3-[10,15,20-tris(3,5-di-tert-butylphenyl)porphyrin-5-yl]phenoxy)ethanol, octaethylporphyrin, tetrabenzoporphyrin, tetranaphthoporphyrin, tetraanthraporphyrin, tetraphenyltetrabenzoporphyrin, and tetraphenyltetraanthraporphyrin.

10. The microcapsule of claim 8, wherein the phthalocyanine is octabutoxyphthalocyanine or octa-triethyleneoxysulfonyl phthalocyanine.

11. An article of manufacture, comprising:
    microcapsules with an average size of at least 5 um, each microcapsule comprising:
      a transparent shell encapsulating a mixture, wherein:
        the mixture comprises a molecular sensitizer and a molecular annihilator that, in combination, are able to produce visible light in response to electromagnetic radiation with a wavelength greater than 800 nm; and
        the molecular sensitizer and the molecular annihilator are suspended in a transparent material selected from the group consisting of a non-solvent liquid, an oil, and a gel.

12. The article of manufacture of claim 11, wherein the transparent shell is a urea-formaldehyde shell.

13. The article of manufacture of claim 11, further comprising a photocatalyst.

14. A method comprising:
    forming a microcapsule, the forming comprising:
      obtaining a mixture comprising a molecular sensitizer and a molecular annihilator that, in combination, are able to produce visible light in response to electromagnetic radiation with a wavelength greater than 800 nm, wherein the molecular sensitizer and the molecular annihilator are suspended in a transparent material selected from the group consisting of a non-solvent liquid, an oil, and a gel; and
      encapsulating the mixture in a transparent shell larger than 5 μm, wherein the encapsulating comprises forming an emulsion that includes the mixture and a shell formation solution.

15. The method of claim 14, further comprising:
    forming a reaction system that includes the microcapsule, a photocatalyst, and a substrate; and
    exposing the reaction system to light having sufficient energy to excite the molecular sensitizer to a singlet excited state.

16. The method of claim 14, wherein the molecular annihilator is selected from the group consisting of a furanyldiketopyrrolopyrrole and a perylene.

17. The method of claim 14, wherein the molecular sensitizer is selected from the group consisting of palladium (II) octabutoxyphthalocyanine and platinum (II) tetraphenyltetranaphthoporphyrin.

18. The method of claim 15, wherein the substrate is an organic molecule.

19. The method of claim 15, wherein the photocatalyst is a cationic transition metal complex.

20. The method of claim 14, wherein the shell formation solution comprises water and urea.

* * * * *